3,455,952
PROCESS FOR THE PRODUCTION OF THIIRANES
George F. Bulbenko, Levittown, and William A. Jackle, Newtown, Pa., assignors to Thiokol Chemical Corporation, Bristol, Pa., a corporation of Delaware
No Drawing. Filed Aug. 4, 1966, Ser. No. 570,147
Int. Cl. C07d 59/00
U.S. Cl. 260—327          16 Claims

ABSTRACT OF THE DISCLOSURE

A monomeric thiirane compound, e.g. ethylene sulfide, is prepared and recovered in monomeric form by heating the corresponding alkylene trithiocarbonate, e.g. ethylene trithiocarbonate in a reaction vessel in the presence of an inorganic basic catalyst having a $pK_b$ of from 0 to about 3, e.g. KOH, under such conditions of pressure and temperature that the trithiocarbonate is pyrolized to the monomeric thiirane and the latter compound is maintained in a gaseous state, and rapidly removing the gaseous monomeric from the presence of the catalyst before polymerization occurs.

---

This invention relates to a process for the production of vicinal episulfide compounds (thiiranes). More particularly, the invention relates to a process for the production of vicinal episulfides by the decomposition of alkylene trithiocarbonates.

Various methods have been shown in the prior art for the preparation of thiirane compounds from alkylene carbonates, alkylene monothiocarbonates, and alkylene dithiocarbonates. The preparation of thiiranes by the reaction of cyclic carbonates with an alkali thiocyanate is taught by S. Searles et al. in J. Org. Chem. 27, 2828–34 (1962). The preparation of a thiirane (ethylene sulfide) by the pyrolysis of ethylene monothiocarbonate is taught by D. D. Reynolds in U.S. Patent 2,828,318. Ethylene and propylene dithiocarbonates decomposed in the presence of alkylene oxides and tetraethyl ammonium bromide as reported by V. S. Etlis in Zh. Obsh. Khim. 34 (9) 2996–9 (1964) (see also Chem. Abstracts 61, 14515h (1964)). Various attempts have been made to pyrolyze alkylene trithiocarbonates to produce thiirane compounds in good yields. Such attempts have, however, met in failure up to the time of this invention. Durden et al. in J. Am. Chem. Soc. 82, 3082–4 (1960), for example, disclose a failure to obtain any ethylene sulfide from ethylene trithiocarbonate.

It is therefore an object of the present invention to provide a novel process for producing thiirane compounds from alkylene trithiocarbonates. Moreover, it is an object of the present invention to produce a novel process for producing thiirane compounds utilizing a novel catalyst which gives improved yields of the monomeric product. It is a further object to provide a process for producing thiirane compounds which utilizes a novel and economical catalyst system which results in a product free of contaminants from said catalyst thereby alleviating the necessity of additional separation steps. Further objects will become apparent from the disclosure of this invention.

It has now been unexpectedly found that thiiranes can be readily prepared in excellent yields by heating an alkylene trithiocarbonate in contact with a strong basic catalyst under conditions of temperature and pressure such that the thiirane formed will be in the vapor state in the reaction chamber while the catalyst used will remain in the solid or liquid state as the process proceeds and then rapidly removing the thiirane from the presence of the catalyst. Thus, the reaction is conducted at or above the boiling point of the thiirane being produced and the gaseous thiirane is then rapidly removed from the reaction vessel. If the temperature and pressure employed is such that the thiirane formed will be in a liquid or solid state in the reaction chamber while the catalyst remains in a solid or liquid state then only a polymeric product is recoverable because the thiirane will polymerize as readily as it is formed. As a by-product of the process of this invention, carbonyl disulfide is produced at the rate of one mole of carbonyl disulfide per mole of thiirane produced.

The temperature and pressure employed in the process of this invention may be varied over a wide range. However, in a preferred method of preparing monomeric thiirane compounds according to the process of the present invention, an alkylene trithiocarbonate is heated to a temperature between about 100° to about 200° C. and preferably at a temperature of from about 120° C. to about 140° C. The preferred pressure employed in the process of this invention may be from about 2 millimeters (of mercury) to about 100 millimeters and preferably from about 20 millimeters to about 40 millimeters depending on the thiirane monomer being formed and the reaction temperature. Reduced pressures tend to provide very high yields of monomer due to the fact that the thiirane produced can be rapidly removed from the reaction vessel by means of the vacuum employed to obtain the reduced pressure.

The alkylene trithiocarbonates which can be used in this invention are preferably those compounds having the following general structural formula:

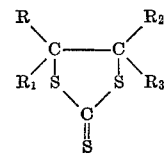

wherein R, $R_1$, $R_2$, and $R_3$ may be the same or different and may be hydrogen, alkyl, cycloalkyl, aryl, aralkyl, alkaryl, alkenyl, cycloalkenyl, and like substituted or unsubstituted groups, and wherein any two of the groups R, $R_1$, $R_2$, and $R_3$ may be interconnected to form a carbocyclic group, such as a cycloalkyl, or cycloalkenyl group. Examples of alkylene trithiocarbonates which may be used in this invention are alkyl substituted alkylene trithiocarbonates, such as ethylene trithiocarbonate, propylene trithiocarbonate, isobutylene trithiocarbonate, 1,2-butylene trithiocarbonate, 2,3-butylene trithiocarbonate, isoamylene trithiocarbonate, n-hexylene trithiocarbonate, methyl amylene trithiocarbotnate, and laurylene trithiocarbonate. Typical of alkylene trithiocarbonates substituted with unsaturated groups which may be employed in this invention are 1,2-butadiene trithiocarbonate, 2,3-hexadiene trithiocarbonate and the like. Exemplary of cyclic compounds, including alicyclic as well as aromatic compounds, which may be used in the present invention are cyclohexene trithiocarbonate, styrene trithiocarbonate, cyclopentene trithiocarbonate, methyl cyclohexenes trithiocarbonate, vinyl cyclohexane trithiocarbonate, phenylpropylene trithiocarbonate, and the like. Also suitable in this invention are substituted derivatives of the above-mentioned trithiocarbonate compounds such as chloropropylene trithiocarbonate, hydroxypropylene trithiocarbonate, and the like. The substituent groups should be those which will not lead to undesirable side reactions.

Examples of the thiiranes formed by the process of this invention are ethylene sulfide, propylene sulfide, isobutylene sulfide, 1,2-butylene sulfide, 2,3-butylene sulfide, isoamylene sulfide, n-hexylene sulfide, methyl amylene sulfide, laurylene sulfide, 1,2-butadiene sulfide, 2,3-hexadiene sulfide, cyclohexene sulfide, styrene sulfide, cyclopentene sulfide, methyl cyclohexene sulfide, vinyl cyclohexane sulfide, phenyl propylene sulfide, chloropropylene sulfide and hydroxypropylene sulfide.

The catalyst which is used in the process of this invention is a strong basic compound, i.e. a basic compound having a $pK_b$ of from 0 to about 3. Basicity in terms of $pK_b$ is defined in Fieser and Fieser, Organic Chemistry, 2nd edition, 1959, pp. 222–3. A preferred group of such basic compounds are strong inorganic bases, such as the metal hydroxides and alkoxides of the Group Ia and Group IIa metals of the Periodic Table.[1] Examples of these are the hydroxides and alkoxides of lithium, sodium, potassium, rubidium, cesium, beryllium, magnesium, calcium, and strontium. The preferred catalyst is potassium hydroxide.

It has, furthermore, been unexpectedly found that ex-Cellosolves such as n-hexyl Cellosolve, and ester of aropyrolysis reaction in an inert organic solvent having a relatively low volatility under the reaction conditions employed. Therefore, a preferred embodiment of the present invention is to conduct the process in an inert organic solvent. Examples of solvents which may be used in the invention are polyglycols such as tetraethylene glycol dimethyl ether, polyalkylene glycols such as polyethylene glycol, polythioether glycols such as thiodiethyleneglycol, cyclic sulfones such as tetramethylene sulfone, alkyl carbitols such as butyl carbitol, aliphatic formamides having at least ten carbon atoms in the aliphatic chain, alkyl cellosolves such as n-hexyl cellosolve, and esters of aromatic carboxylic acids such as diethyl phthalate, and distilled petroleum hydrocarbons such as deodorized kerosene. The particular solvent utilized will preferably be one which will be vaporize under the reaction conditions employed, and hence the boiling point of the solvent should be of greater magnitude than that of the particular thiirane being produced by the process of this invention under the reaction conditions being employed.

The catalyst is used in catalytically effective amounts and the exact amounts will depend upon the paticular alkylene trithiocarbonate reactants employed. Generally, the amount of catalyst employed will be within the range of from about 0.2 to about 5 mol percent of the quantity of alkylene trithiocarbonate employed.

The following examples are merely illustrative of this invention and are not intended as a limitation upon the scope thereof.

Example 1

119.3 grams of ethylene trithiocarbonate and 1 gram of KOH were mixed at room temperature and then heated to 120 to 140° for 8 hours at a pressure of 2 to 4 mm. Hg. A vacuum pump was located on the exhaust line, thereby providing for rapid removal of gaseous product. Gas chromatographic analysis indicated a yield of 20.4 grams of ethylene sulfide ($n_D^{27}=1.4895$) or a 39% yield. However, 27 grams of ethylene trithiocarobnate, a yellow solid, having a melting point of 29–33° C., remained in the reactor, thus indicating a 52% yield based upon the weight of ethylene trithiocarbonate which actually reacted.

Example 2

17.3 grams of ethylene trithiocarbonate which had been washed with a dilute acetic acid solution to leave the trithiocarbonate neutral to slightly acidic, was heated to a temperature of 140 to 185° C. at 2 mm. Hg for an 8 hour period. No ethylene sulfide was obtained. The use of an alumina ($Al_2O_3$) catalyst under the same conditions also failed to yield any ethylene sulfide.

Example 3

One gram of KOH was added to the 17.3 grams of ethylene trithiocarbonate of Example 2 and the temperature of these materials was raised to 180° C. The effluent gases collected in an ice trap yielded 7.0 grams of a yellow liquid. The reaction was run at atmospheric pressure. Gaseous product was removed by means of a nitrogen flush from the reaction vessel. Gas chromatographic analysis showed that 3% of the yellow liquid was ethylene sulfide. A relatively large amount of ethylene sulfide polymer was produced. This was attributed to the relatively slow removal of gaseous product.

Example 4

71.3 grams of ethylene trithiocarbonate, 0.09 g. KOH, and 150 mls. of tetraethylene glycol dimethyl ether were mixed together and heated at 135 to 140° C. at a pressure of 20 mm. Hg for 2.5 hours. 61.4 grams of a yellow liquid was collected in a Dry Ice acetone trap. Gaseous product was rapidly removed from the reaction vessel by means of a vacuum pump. Gas chromatographic analysis indicated that 41% (25.2 grams) of this yellow liquid was ethylene sulfide, which corresponded to a yield of 81% of the theoretical.

Example 5

22.2 grams of ethylene trithiocarbonate and 2 grams of KOH were mixed together and then heated to a temperature of 140° C. at a pressure of 20 mm. Hg for several hours. The effluent gases were collected as a liquid condensate in a Dry Ice trap. Gaseous product was rapidly removed from the reaction vessel by means of a vacuum pump. Gas chromatographic analysis showed the liquid condenstate to consist of 31% ethylene sulfide or a yield of 25% of the theoretical.

Example 6

68 grams of ethylene trithiocarbonate and, as a catalyst, 0.68 gram of sodium methoxide were mixed into 130 grams of tetraethylene glycol dimethyl ether. The reaction mixture was then heated to a temperature of 140–145° C. at a pressure of 20 mm. Hg for a period of 4 hours. Gaseous product was rapidly removed from the reaction vessel by means of a vacuum pump. The effluent gases which were collected as a liquid in an ice trap showed 30% ethylene sulfide to be present for a 48% yield upon the weight of ethylene trithiocarbonate employed in the reaction.

Examples 7 and 8

The procedure of Example 6 was repeated except that a different catalyst was used in these examples.

| Example No. | Catalyst | Yield (based on weight of ethylene trithiocarbonate) |
| --- | --- | --- |
| 7 | Piperazine | No ethylene sulfide produced. |
| 8 | NaOH | 75%. |

The process of this invention is especially preferred for producing thiiranes which have a tendency to polymerize. Therefore, the process of this invention is especially applicable for production of thiiranes having up to 4 carbon atoms such as ethylene, propylene, and butylene sulfide, which tend to polymerize immediately upon contact with a basic catalyst.

We claim:

1. A process for producing and recovering a monomeric thiirane compound which comprises heating an alkylene trithiocarbonate in a reaction vessel in the presence of a catalytic amount of an inorganic basic catalyst having a $pK_b$ of from 0 to about 3 at a reduced pressure and at an elevated temperature sufficient both to pyrolyze said trithiocarbonate to produce monomeric thiirane compound and to maintain said monomeric thiirane compound in a gaseous state, and removing said thiirane in its gaseous monomeric state from the presence of the catalyst at a rate sufficient to avoid polymerization of the monomer.

---

[1] The Periodic Table referred to is the Mendeleef table printed in Lange's Handbook of Chemistry, ninth edition, McGraw-Hill, 1956, pp. 56–57.

2. A process as in claim 1 in which said alkylene trithiocarbonate has the structure

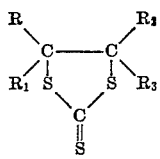

wherein R, $R_1$, $R_2$, and $R_3$ may be hydrogen, alkyl, cycloalkyl, aryl, aralkyl, alkaryl, alkenyl, cycloalkenyl, or the like substituted and unsubstituted groups, and wherein any two of the groups R, $R_1$, $R_2$, and $R_3$ may be interconnected to form a carbocyclic group.

3. A process as in claim 2 wherein the alkylene trithiocarbonate is ethylene trithiocarbonate.

4. A process as in claim 2 wherein the alkylene trithiocarbonate is propylene trithiocarbonate.

5. A process as in claim 2 wherein the basic catalyst is an inorganic base having a $pK_b$ of from 0 to about 3.

6. A process as in claim 5 wherein the basic catalyst comprises at least one compound selected from the group consisting of the hydroxides and alkoxides of the Group Ia and Group IIa metals.

7. A process as in claim 6 wherein the basic catalyst is sodium hydroxide.

8. A process as in claim 6 wherein the basic catalyst is potassium hydroxide.

9. A process as in claim 1 wherein the alkylene trithiocarbonate is heated at a temperature of between about 100° C. to about 200° C. while maintaining a pressure in the reaction vessel of from about 2 mm. Hg to about 100 mm. Hg.

10. A process as in claim 9 wherein the temperature is from about 120° C. to about 140° C. and the pressure is from about 20 mm. Hg to about 40 mm. Hg.

11. A process as in claim 1 wherein the heating is carried out in the presence of an inert organic solvent having a low volatility relative to that of the monomeric thiirane compound.

12. A process as in claim 11 wherein the heating is carried out at a temperature of between about 100° C. to about 200° C. and the reaction vessel is maintained at an internal pressure of from about 2 mm. Hg to about 100 mm. Hg.

13. A process as in claim 11 wherein the inert solvent is a polyglycol.

14. A process as in claim 13 wherein the inert organic solvent is tetraethylene glycol dimethyl ether.

15. A process for producing and recovering monomeric ethylene sulfide which comprises heating ethylene trithiocarbonate in a reaction vessel in the presence of a catalytic amount of an inorganic basic catalyst selected from KOH and NaOH at a pyrolyzing and vaporizing temperature of between about 100° C. to about 200° C. while maintaining a pressure in the vessel of from about 2 mm. Hg to about 100 mm. Hg and removing monomeric gaseous ethylene sulfide from the vessel as it is formed.

16. A process as in claim 15 wherein the heating is carried out in the presence of an inert organic solvent having a low volatility relative to that of ethylene sulfide.

References Cited

UNITED STATES PATENTS

| | | | |
|---|---|---|---|
| 2,828,318 | 3/1958 | Reynolds | 260—327 |
| 3,073,846 | 1/1963 | Millikan | 260—327 |
| 3,317,489 | 5/1967 | Sander | 260—79 |

OTHER REFERENCES

Durden et al.: J. Org. Chem., vol. 26 (1961), pp. 836–9.

JAMES A. PATTEN, Primary Examiner

U.S. Cl. X.R.

260—79.7